United States Patent [19]
Stark et al.

[11] Patent Number: 5,424,547
[45] Date of Patent: Jun. 13, 1995

[54] UV CUREMETER AND METHOD

[75] Inventors: Lawrence R. Stark; Ramil R. Yaldaei, both of San Jose; Pavel Y. Ronin, San Francisco; Mikhail Spitkovsky, Sunnyvale; Bernard S. Siegal, Menlo Park; Dan D. Ghiocel, Fremont, all of Calif.

[73] Assignee: Optical Associates, Inc., Milpitas, Calif.

[21] Appl. No.: 131,788

[22] Filed: Oct. 4, 1993

[51] Int. Cl.$^6$ .............................................. G01J 1/42
[52] U.S. Cl. .................................................. 250/372
[58] Field of Search ............ 250/372 R, 474.1, 482.1, 250/372 EM

[56] References Cited

U.S. PATENT DOCUMENTS

| | | | |
|---|---|---|---|
| 4,644,165 | 2/1987 | Ross et al. | 250/372 R |
| 4,665,627 | 5/1987 | Wilde et al. | 250/372 R |
| 5,107,123 | 4/1992 | Shi | 250/372 EM |
| 5,306,917 | 4/1994 | Black et al. | 250/372 EM |

*Primary Examiner*—Carolyn E. Fields
*Attorney, Agent, or Firm*—Flehr, Hohbach, Test, Albritton & Herbert

[57] ABSTRACT

Curemeter and method in which UV exposure is monitored by a portable data collection module and data from the module is processed by a docking station which is located remotely from the site where the UV radiation is present. Temperature is also monitored at the data collection module, and the UV exposure data is compensated for variations in temperature. The data collection module includes shielding and filters to protect the UV detector from the harsh environment in which the UV readings are taken and to limit the radiation impinging upon the detector to the desired spectrum. Programmable thresholds for the detector signals protect against the collection of spurious data.

20 Claims, 5 Drawing Sheets

FIG_1

FIG_5

FIG_3

FIG_6

UV CUREMETER AND METHOD

BACKGROUND OF THE INVENTION

1. Field of the Invention

This invention pertains generally to the measurement of ultraviolet (UV) radiation and, more particularly, to a system and method for monitoring the exposure of a workpiece to UV radiation during a curing process.

2. Description of the Prior Art

In one type of UV curing system, which is sometimes referred to as a UV curing conveyor, a workpiece is passed on a conveyor beneath a UV source to effect a photochemical change in the workpiece. The exposure of the workpiece to the UV radiation should be carefully monitored because too little exposure will not permit the curing process to be completed, and too much exposure is wasteful and reduces the number of parts which can be processed in a given time.

Since heat is usually a byproduct of the curing process, instruments employed to monitor the UV exposure are often subjected to high temperatures which can affect their performance. Another problem with devices heretofore provided for monitoring UV exposure is that they are not able to provide accurate measurements over a broad range of temperatures.

One device heretofore provided for measuring UV radiation is described in U.S. Pat. No. 4,644,165. That device is self contained and is intended primarily for use in determining the total amount of UV energy applied to photoetch material in the manufacture of printed circuit boards.

OBJECTS AND SUMMARY OF THE INVENTION

It is in general an object of the invention to provide a new and improved system and method for monitoring exposure to UV radiation.

Another object of the invention is to provide a system and method of the above character which overcome the limitations and disadvantages of devices heretofore employed for monitoring UV exposure.

Another object of the invention is to provide a system and method of the above character which are particularly suitable for use in monitoring the exposure of workpieces to UV radiation in a curing process.

These and other objects are achieved in accordance with the invention by providing a curemeter and method in which UV exposure is monitored by a portable data collection module and data from the module is processed by a docking station which is located remotely from the site where the UV radiation is present. Temperature is also monitored at the data collection module, and the UV exposure data is compensated for variations in temperature. The data collection module includes shielding and filters to protect the UV detector from the harsh environment in which the UV readings are taken and to limit the radiation impinging upon the detector to the desired spectrum. Programmable thresholds for the detector signals protect against the collection of spurious data.

DETAILED DESCRIPTION

Figure 1:
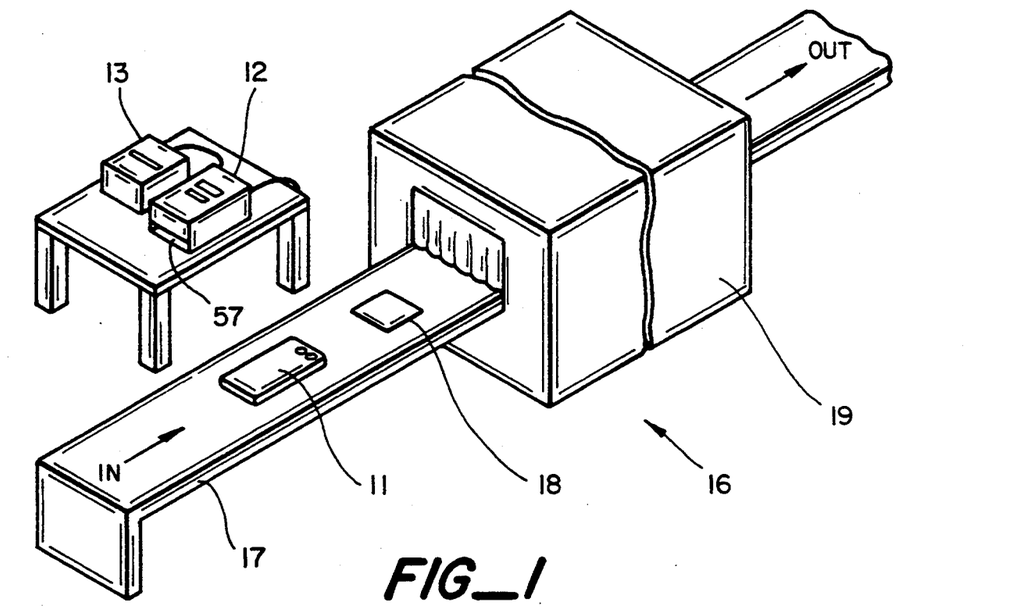
FIG. 1 is an isometric view of one embodiment of a UV curemeter incorporating the invention in combination with a UV curing system.

As illustrated in FIG. 1, the curemeter consists of a portable data collection module or probe 11 and a docking station 12 having a printer 13 connected thereto. In this particular embodiment, the curemeter is shown in connection with a UV curing system 16 of conventional design. This system includes a traveling conveyor 17 on which workpieces 18 are transported through a UV furnace 19. As noted above, the amount of UV exposure which the workpieces receive is somewhat critical since too little exposure will not provide proper curing and too much exposure is wasteful.

The data collection module or probe 12 is self-contained and separable from the docking station, and is capable of withstanding the high temperatures and harsh environment of the curing furnace. The docking station 13 is positioned at a remote location away from the curing furnace where it is not subjected to the high temperatures and harsh conditions of the furnace.

Figure 2:
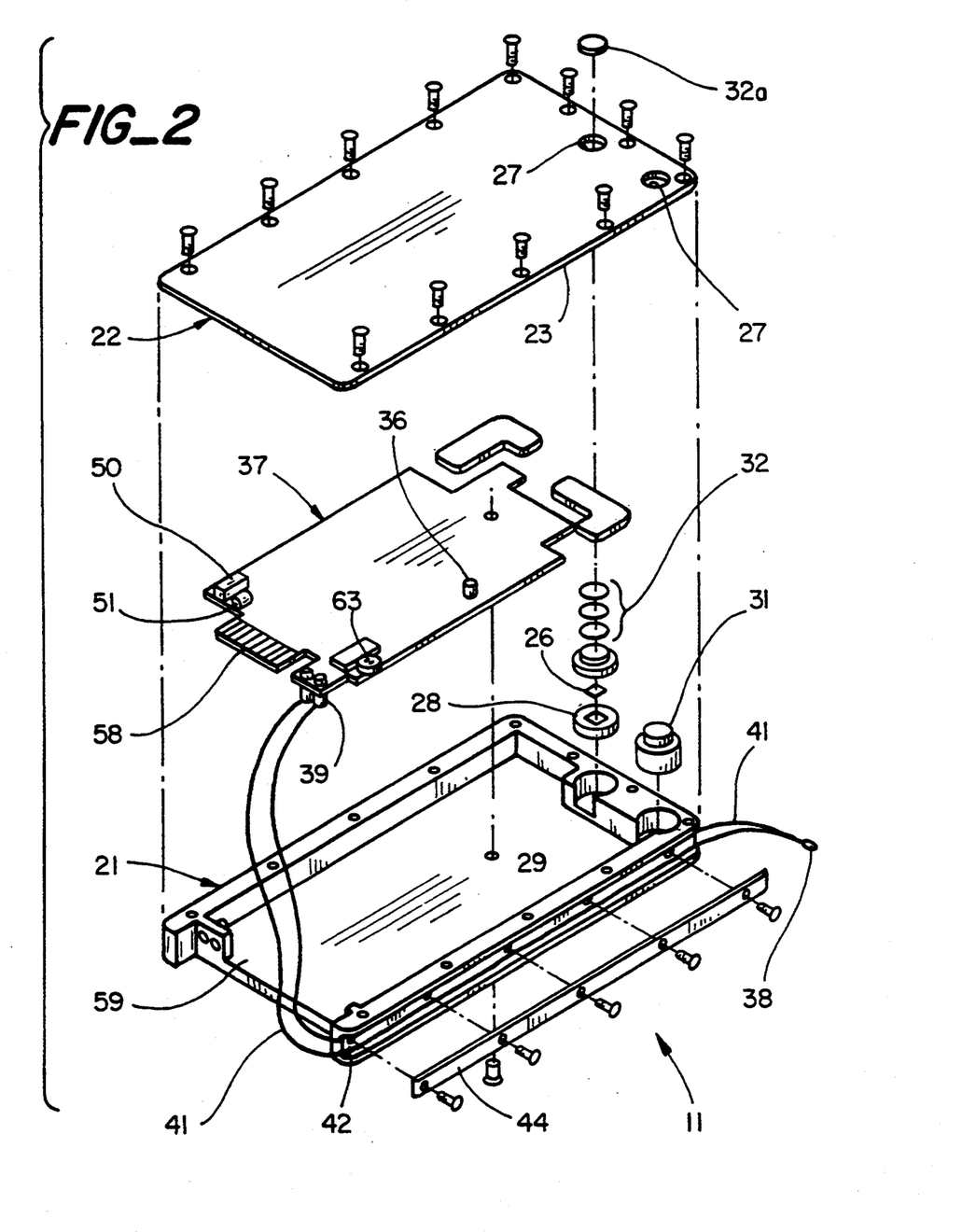
FIG. 2 is an exploded isometric view of the data collection module in the embodiment of FIG. 1.

The data collection module or probe 11 has a generally rectangular housing which includes a base section 21 and a cover 22. One function of the housing is to protect the components within it from the high temperatures and harsh environment within the furnace, and the base section is fabricated of a metal such as aluminum. The cover is fabricated of a high temperature plastic with heat reflective coatings and a layer of copper 23 on its under side. With the aluminum base and the copper layer, all of the components within the housing are surrounded by a continuous metal enclosure and thus shielded from RF radiation.

The probe has one or more UV detectors or sensors 26 positioned toward the front of the housing for exposure to UV radiation through openings or windows 27 in the cover. The detectors comprise photodiodes mounted in holders 28 which are received in bores 29 in the base section of the housing. In the embodiment illustrated, windows and bores are provided for two detectors, and if only one detector is desired, the unused window is closed off by a plug 31 in the unused bore.

A stack of shields and filters 32 is positioned in front of each of the detectors to protect the detectors from being damaged by excessive heating from direct exposure to the UV radiation or from heated air within the furnace. The uppermost shield 32a is a reflector which is made of a UV grade silica which reflects approximately 90 percent of the radiation impinging upon its surface over a wide spectrum. Beneath this reflector is a diffuser fabricated of Teflon which serves to diffuse the incoming radiation. The rest of the stack further cuts down the level of radiation reaching the detector, and also limits the radiation impinging upon the detector to the desired spectrum.

Figure 3:
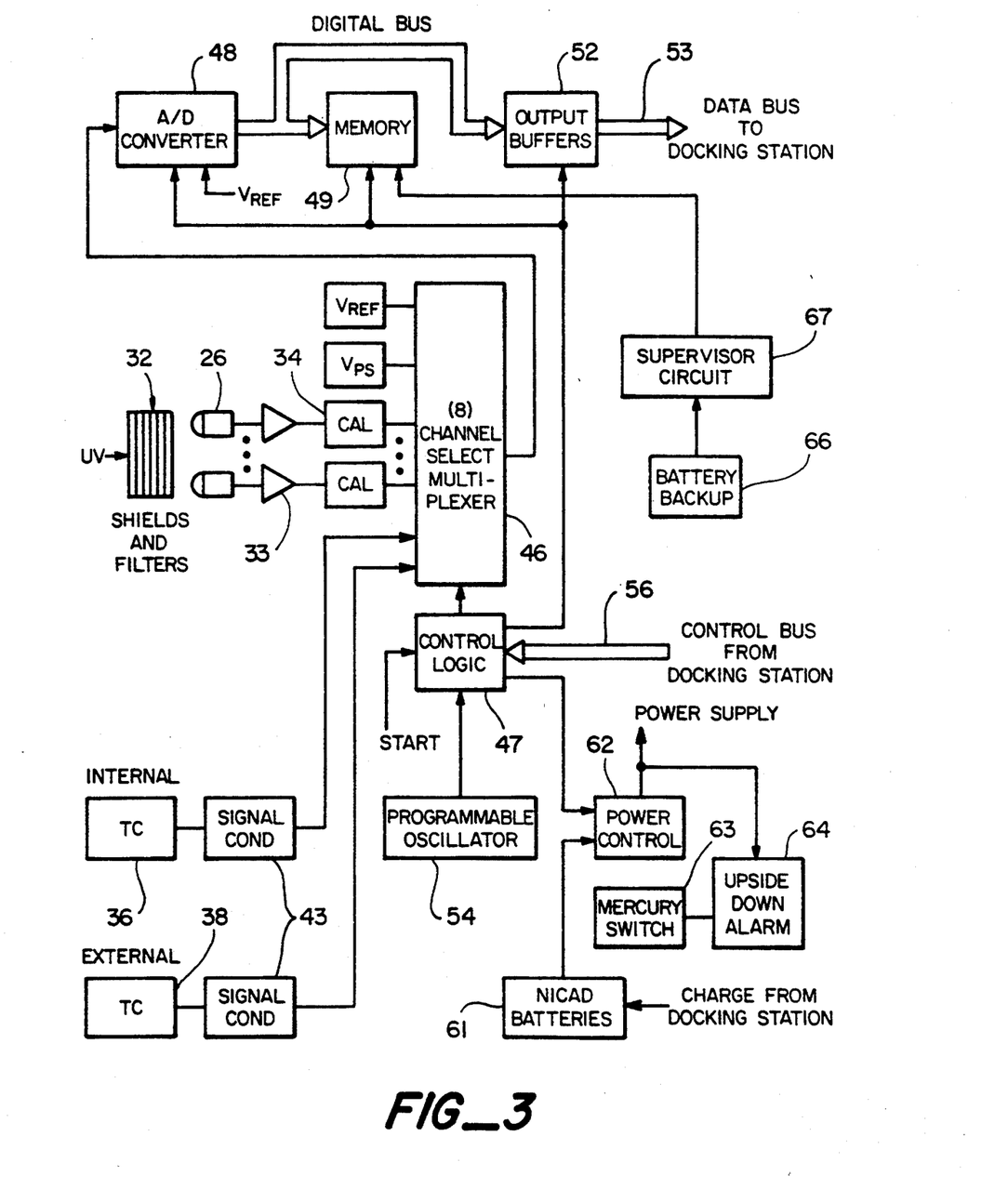
FIG. 3 is block diagram of the data collection module in the embodiment of FIG. 1.

Each of the detectors provides a continuous signal proportional to the intensity of the radiation impinging upon the sensitive area in the middle of the photodiode. The signal from each detector is applied to an amplifier 33 with minimum offset. The output of each amplifier is applied to a calibration circuit 34 to provide the correct level of UV signal for each detector.

Means is also provided for monitoring temperature both internally and externally of the probe. This means includes an internal temperature sensor 36 which is mounted on a circuit board 37 within the housing and an external sensor 38 which is connected to terminals 39 on the circuit board by flexible leads 41. Those leads pass through a channel 42 which extends along one side of the base section of the housing, with a cover plate 42. The sensors comprise J-type thermocouples connected to signal conditioning circuits 43 which provide output signals proportional to temperature (e.g., 10 mV/C°).

The internal thermocouple is used by the system for compensation of the UV measurement values based on temperature. The external thermocouple is available to the user and can be positioned and utilized as desired.

After calibration and conditioning, the signals from the UV detectors and the temperature sensors are applied to the inputs of a channel selector or multiplexer 46. Voltages $V_{REF}$ and $V_{PS}$ are applied to two other inputs of the multiplexer. In the embodiment illustrated, the multiplexer has eight input channels and can accommodate up to four UV detectors. The multiplexer is controlled by logic circuitry 47 and switches sequentially through the eight input channels continuously.

The output of the multiplexer is connected to the input of an analog-to-digital (A/D) converter 47 which provides an 8-bit digital output for each of the eight input channels. The timing of the A/D converter is controlled by internal logic, and the output of the A/D converter is directed to a memory circuit 49.

The output of the A/D converter is stored in the memory in sequence, byte by byte, and the data for each channel can be retrieved through a modulo channel number operation. Since the sampling rate is constant, the data stored in the memory represents the measurements performed in real time.

Data stored in the memory is saved until a new data acquisition cycle is initiated. The memory is erased at the beginning of each cycle in order to prevent the new data from overlapping with the old data. The new cycle is initiated by actuating a START switch 50 mounted on the circuit board at the rear of the unit. The memory clearing process takes less than a second to complete after the START switch is actuated.

The module also has program constants and identifying information, such as a serial number, stored in a non-volatile portion of the memory. This memory is accessible only when the module is connected to the docking station, which permits each module and its calibration and program constants to be uniquely tracked.

An LED 51 mounted on the circuit board next to the START switch blinks to provide a visual indication when data is being collected in the UV environment and when data is being transferred from the module to the docking station.

Data stored in the memory is transferred to the docking station through output buffers 52 and the output lines of a data bus 53. The memory output is enabled, and with each byte, the output lines are enabled to drive the data lines to send the byte to the docking station. The A/D converter, memory and buffers are all controlled by control logic 47.

The control logic is driven by a programmable oscillator 54 which provides the basic fast clock which is used for the analog-to-digital converter. In addition, the programmed output can be controlled to divide the clock rate by 256, 9102 or 65536, thereby permitting different data acquisition speeds. When the data acquisition process is initiated, the basic clock speed is applied during the memory clear cycle. After the memory is cleared, the data acquisition clock set by the programming is applied to a sequencer circuit in the control logic.

During the data acquisition process, the sequencer circuit provides a state count that allows for step by step control of the memory location address, channel selection, the start of analog-to-digital conversion, the storage of data in the memory, checking for the end of the data acquisition process, and turning off the power at the end of the cycle. As a result of this timing control, data is recorded at fixed time intervals which permit the recorded data to be analyzed on a realtime basis.

During a read cycle, the sequencer sets the memory address, sends handshaking signals, and outputs the data byte to the docking station. When the probe is connected to the docking station, the control logic receives control signals from the docking station over a control bus 56.

The memory control logic circuitry selects the functional sequence to be used: memory clear, data acquisition, read data, or read/write test. The selection is based on the status of the input connector and on the step of the sequencer.

Figure 4:
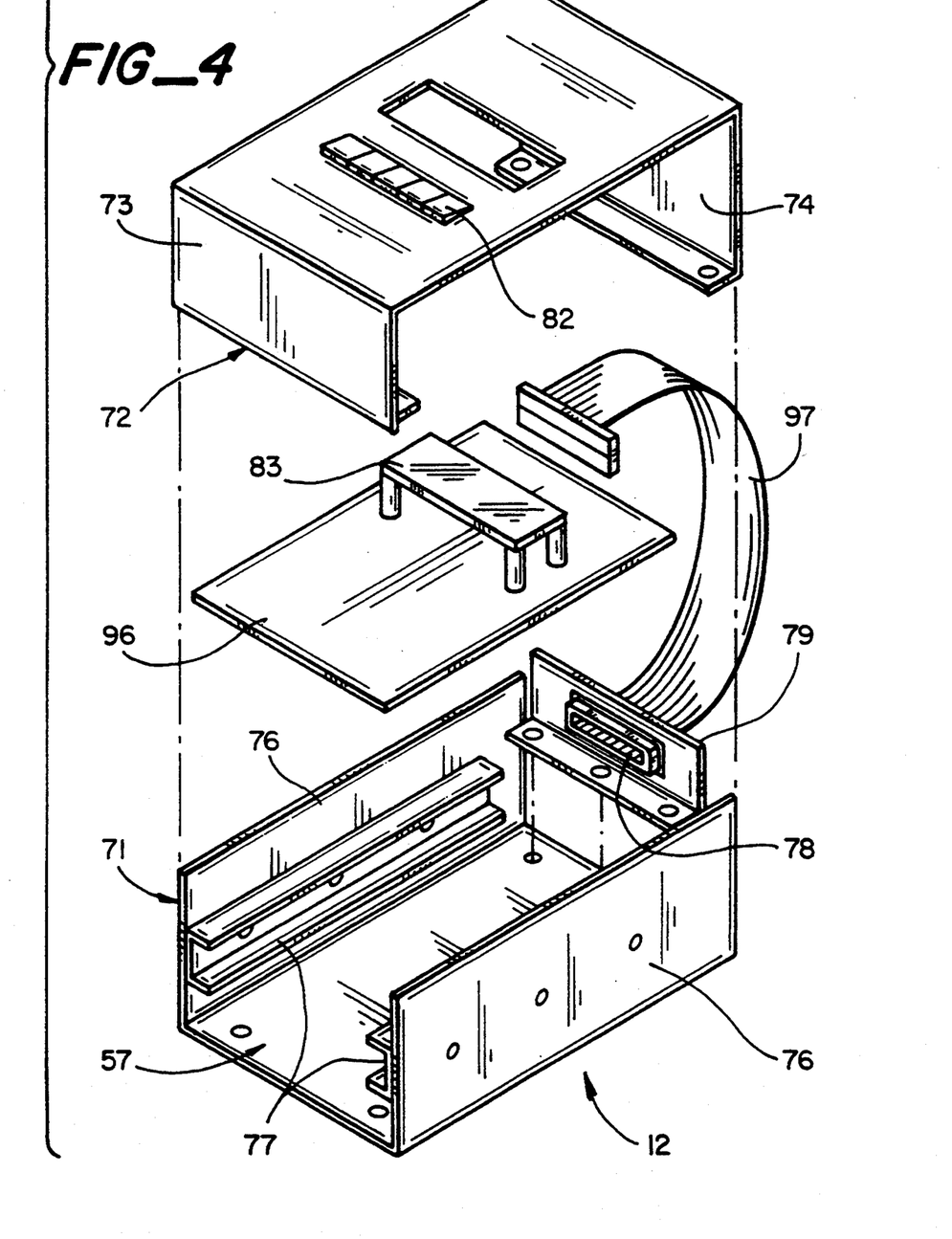
FIG. 4 is an exploded isometric view of the docking station in the embodiment of FIG. 1.

The probe is adapted to be inserted into a slot 57 in the docking station, and has an interface connector 58 on the circuit board which is accessible through an opening 59 at the rear of the probe housing. Connections for both the data bus and the control bus are made through this connector.

The buffers through which the probe interfaces with the docking station have pull-up resistors which permit the probe to be inserted into the docking station when both devices are powered on, without damage or loss of data.

The data acquisition module or probe is powered by Ni-Cad batteries 61 which are charged from the docking station while the probe is connected to it. A power control circuit 62, controlled by control logic 47, applies power to the probe when the START switch is actuated and turns it off again at the end of the data acquisition cycle. The rest of the time, no power is drawn from the batteries.

A mercury switch 63 is connected to an alarm 64 to provide an audible warning in the event that the probe is positioned upside down since the probe will not work properly if it is placed on the conveyor in that position.

The reference voltage $V_{REF}$, which is applied both to the multiplexer and to the A/D converter, is derived from the power supply voltage and is regulated to provide accurate measurements independently of variation in the supply voltage.

Backup power is supplied to memory 49 from a lithium battery 66 through a supervisor circuit 67, which automatically switches over to the lithium battery when the power from the NiCad batteries is turned off. The batteries are mounted on circuit board 37 along with the other components of the probe such as the signal conditioners, multiplexer, A/D converter, memory, buffers, control logic, oscillator, power control, supervisor circuit and alarm.

The docking station has a generally rectangular housing which includes generally U-shaped base and cover sections 71, 72. The front wall 73 of the cover section is shorter than the rear wall 74 of the cover section and the side walls 76 of the base section, and there is an opening beneath the front wall of the cover section which forms the slot 57 into which the data collection module is inserted. Guide rails 77 are mounted on the side wall of the base section for receiving the data collection module when it is inserted into the docking station. A connector 78 is mounted on a bracket 79 at the rear of the base section for engagement with the interface connector 58 on the circuit board in the module. The housing sections are fabricated of a metal such as aluminum and provide RF shielding for the components enclosed therein.

Figure 5:
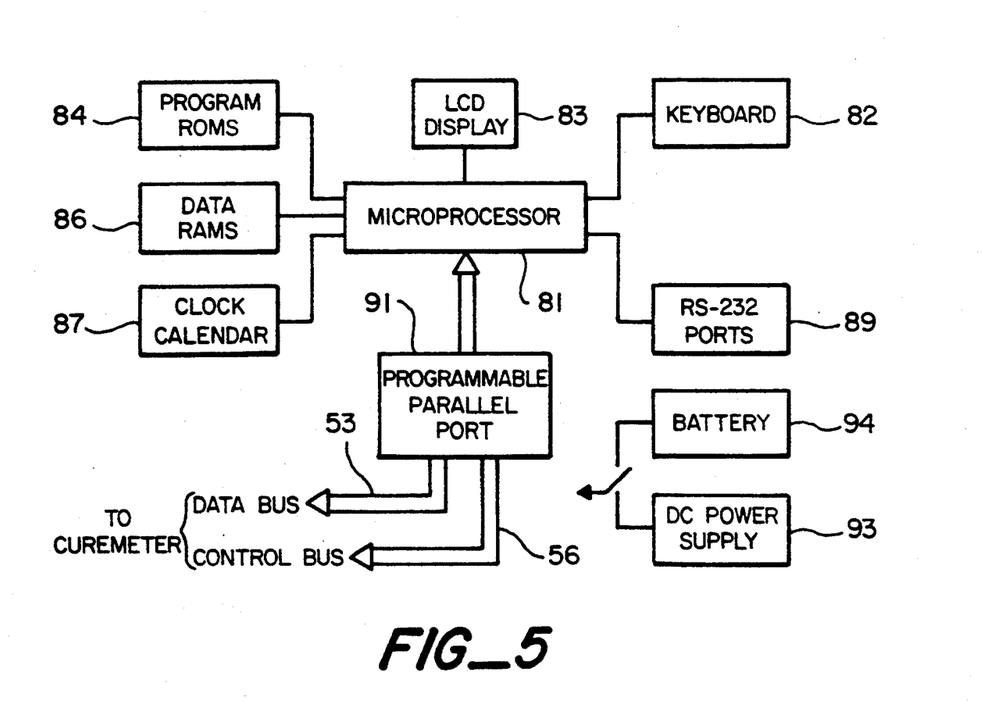
FIG. 5 is a block diagram of the docking station in the embodiment of FIG. 1.

The docking station has a CPU or microprocessor 81 to which a keyboard 82, an LCD display 83, program ROMS 84, data RAMS 86, a clock calendar 87, RS-232 ports 89, and a programmable parallel port 91 are connected. Connections to the data and control busses are made through the programmable parallel port.

In one presently preferred embodiment, the CPU is a Z80180/64180 microprocessor which operates at a clock speed of 18.432 Mhz, with a crystal oscillator and buffer drivers for decoding page addresses. In order to permit a larger number of components including an expansion bus to be driven, bidirectional buffer drivers are used for the data lines and for the lower address lines. In this embodiment two EPROMS (256 KB) are provided for program storage and two static RAMS (256 KB) are provided for storing variables and data. The clock calendar permits real time measurements to be made. The CPU can communicate with the outside world through the RS-232 ports, and in this particular embodiment, two such ports are provided.

The CPU communicates with the LCD display (4×20 characters) through a dedicated parallel interface. It can read up to eight keys or switches directly, without latching them or requiring the use for debouncing circuitry. The CPU also reads data from outside the board using a memory mapped, non-latched scheme. All of the inputs use pull-up resistors and Schmitt trigger type circuits in order to make the inputs less sensitive to noise.

The parallel interface adapter is able to latch the output signals and is connected directly to the busses. The outputs are either buffered or use power drivers in order to increase their current capabilities.

Under user control, the CPU is able to transfer the measurement data from the probe to the memory of the docking station. After the data is transferred, the docking station automatically analyzes the data and checks for alarm conditions inside the probe such as a low battery or an unsafe temperature level during the measurement. These alarms are displayed on the LCD display screen.

After the transfer of all of the data, and after the alarms are cleared, a menu driven screen allows the user to choose the desired display. The possible displays include a UV measurement, a temperature measurement, a data printout; and the like. Without losing the information, the user can go back and forth between the different options and analyze the information from different approaches such as maximum UV energy, average UV energy, maximum temperature, accumulated UV energy as a function of time, temperature as a function of time, and the like. The display also provides a warning to the user if data received from the probe is corrupted. Anytime after the data has been transferred, the probe can be removed from the docking station and used for a new measurement.

The docking station can be powered either from an external DC supply 93 or from internal batteries 94. When the external source is used, a trickle charge is supplied to the batteries from it. When the probe is inserted into the docking station, its batteries are charged from the power supply in the docking station. The docking station has a control circuit for the power similar to the one employed in the probe, and in the case of the docking station, the power can be turned off by the CPU following a direct command from the user. When the power is turned off, critical information can be stored in non-volatile. Alternatively, non-volatile static RAM can provided for the storage of all data.

If desired, LEDs can be mounted on the top or front panel of the docking station to provide visual indications of power, alarm, fault, and low battery conditions, with the alarm LED being under direct CPU control and being made to blink at different rates for different failures. The alarm circuit can also be connected to a buzzer which provides different audible indications for different failures.

Components such as the microprocessor, ROM, RAM, the parallel and serial ports, the clock calendar and the battery are mounted on a circuit board 96 above the probe slot, and connections between connector 78 and the components on the circuit board are made by a cable 97.

Figure 6:
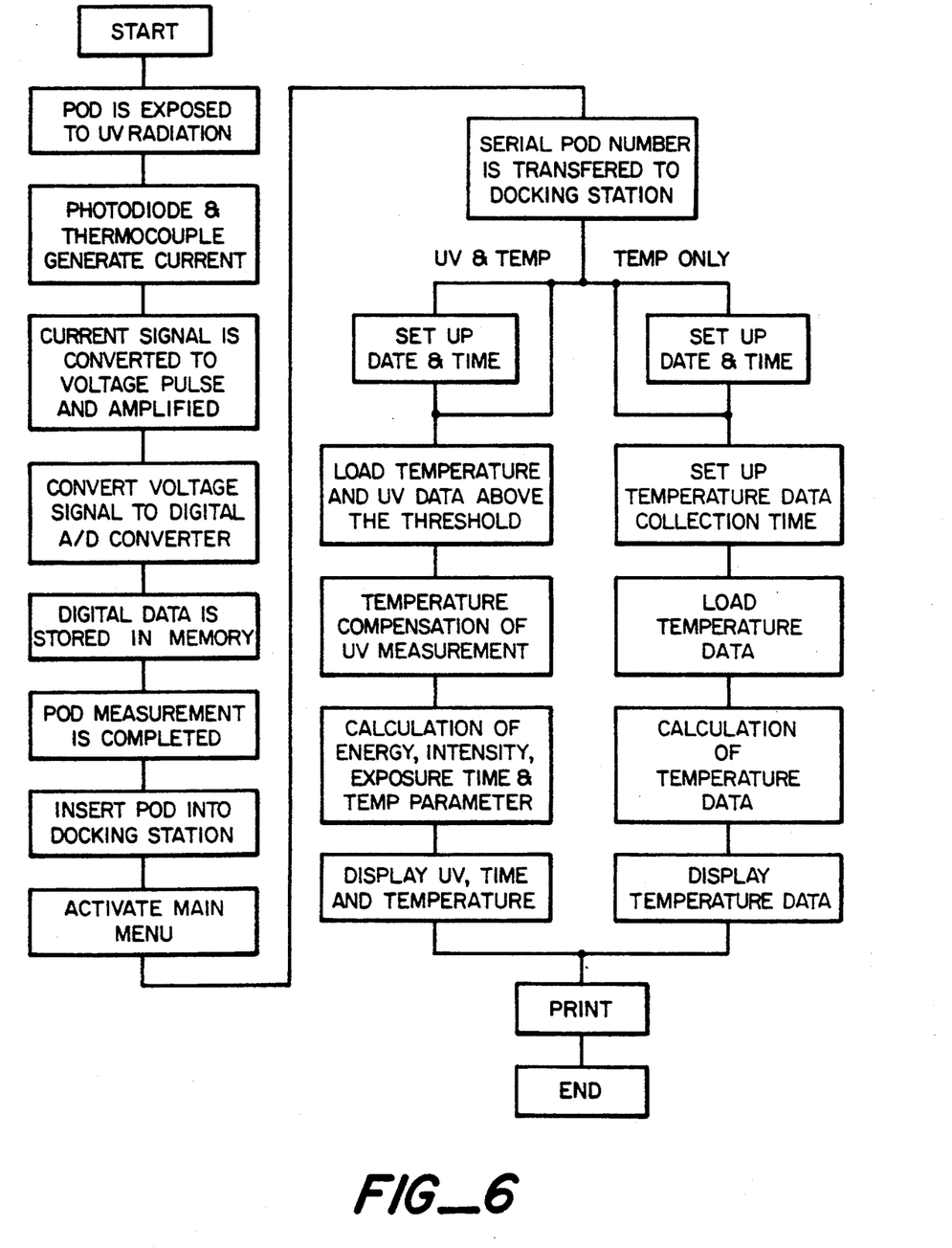
FIG. 6 is an operational flow chart of the embodiment of FIG. 1.

Operation and use of the curemeter, and therein the method of the invention, can be described briefly with reference to the flow chart of FIG. 6. The probe, which is called a POD in the flow chart, is placed on the conveyor with windows 27 facing in an upward direction, and the start switch 50 is actuated. As the probe travels through the oven, UV radiation impinges upon the detectors 26 which generate currents corresponding to the level of the radiation. At the same time, thermocouple 36 generates a current corresponding to the temperature within the probe. The current signals are converted to voltage pulses and amplified, then sequentially applied to the A/D converter for conversion to digital data which is stored in memory 49.

When the measurement is completed, the data acquisition module or probe is inserted into the docking station, the main menu is activated, and the serial number of the probe is transferred to the docking station.

For a measurement of both UV exposure and temperature, the date and time are set up, and temperature data and UV data above the threshold level are loaded. The UV data is then compensated for any variations in temperature, based on the known temperature characteristic of the photodiodes in the UV detectors. The UV energy, intensity, exposure time and temperature parameters are calculated, and the UV level, time and temperature are displayed.

If only temperature is to be measured, the date and time are once again set up, and the time for collecting temperature data is set. The temperature data is then loaded, and the temperature parameters are calculated and displayed.

The invention has a number of important features and advantages. With the data collection module which is separable from the docking station, approximately half of the components of the system are located in the docking station which is isolated from the harsh environment of the curing furnace. This avoids the need to provide temperature compensation for those components.

It is apparent from the foregoing that a new and improved UV curemeter and method have been provided. While only certain presently preferred embodiments have been described in detail, as will be apparent to those familiar with the art, certain changes and modifications can be made without departing from the scope of the invention as defined by the following claims.

We claim:

1. A system for curing and monitoring UV radiation in UV curing of objects, comprising:
    a closed curing UV furnace having means for transporting the material to be cured through said furnace;
    portable data collection module having at least one UV detector for obtaining UV radiation exposure data, means for measuring a first temperature in said UV furnace, means for measuring a second temperature inside said portable data collection module, means for storing and transmitting said data, said first temperature, and said second temperature; an identification data of said portable data collection module; and shield means on one side of said portable data collection module for shielding said at least one UV detector and said means for measuring said first temperature from harsh environment of said UV furnace; and
    a docking station located remotely from said UV furnace and having means for receiving and processing said UV radiation exposure data, said first temperature, and said second temperature.

2. The system of claim 1 wherein said data collection module has a connector with a guide for plugging into said receiving means of said docking station.

3. The system of claim 2 wherein said data collection module has a memory unit which stores said identification data, calibration data for each measurement of said UV radiation exposure, said first temperature, and said second temperature.

4. The system of claim 3 wherein said at least one detector has a diffuser for diffusing said UV radiation.

5. The system of claim 4 wherein said means for measuring said first temperature and said second temperature comprises a first thermocouple and second thermocouple, respectively.

6. The system of claim 5 wherein said portable data collection module has on its side, opposite to said one side, a mercury switch rigidly connected to said portable data collection module and closable when said portable data collection module is turned upside down, and alarm means activated by said mercury switch in said upside down position for preventing overheating of said portable data collection module.

7. The system of claim 6 wherein said portable data collection module has a generally rectangular metal housing, a window in one wall of said housing, said at least one UV detector being mounted inside said housing for exposure to UV radiation through said window, said shielding means comprising a stack of shields and filters positioned between said window and said at least one detector for limiting radiation incident upon said at least one detector, said diffuser being a part of said stack.

8. A method of monitoring UV radiation and temperature in UV curing of objects comprising the steps of:
    passing said objects through a UV furnace together with a portable data collection module which experiences the effect of the same environment as said objects, said portable data collection module having identification data, means for detecting, memorizing, and transmitting data;
    measuring with the use of said portable data collection module: a first temperature of said environment within a predetermined time interval; a second temperature inside said portable data collection module during said time interval; UV radiation exposure data; calibration data for the measurements; and identifying said portable data collection module by means of said identification data;
    storing said data and said temperatures in said portable data collection module;
    moving said data collection module to a docking station located remotely from said furnace, said docking station containing a data processing unit and display means;
    electrically connecting said portable data collection module to said docking station;
    transmitting said UV radiation exposure data, said first temperature, said second temperature, said calibration data, and said identification data from said means for detecting, memorizing, and transmitting data to said data processing unit; and
    processing the UV radiation exposure data, temperatures, and calibration data for controlling UV curing of said objects and correcting the operation of said portable data processing module.

9. A system for curing and monitoring UV radiation in UV curing of objects, comprising:
    a closed curing UV furnace having means for transporting the material to be cured through said furnace;
    portable data collection module having at least one UV detector for obtaining UV radiation exposure data, means for measuring a first temperature in said UV furnace, means for measuring a second temperature inside said portable data collection module, means for storing and transmitting said data, said first temperature, and said second temperature; an identification data of said portable data collection module; and shield means on one side of said portable data collection means for shielding said at least one UV detector and said means for measuring said first temperature from harsh environment of said UV furnace; and
    a docking station located remotely from said UV furnace and having means for receiving and processing said UV radiation exposure data, said first temperature, and said second temperature; said data collection module having a connector with a guide for plugging into said receiving means of said docking station;
    said data collection module having a memory unit which stores said identification data, calibration data for each measurement of said UV radiation exposure, said first temperature, and said second temperature, said at least one detector having a diffuser for diffusing said UV radiation.

10. The system of claim 9 wherein said means for measuring said first temperature and said second temperature comprises a first thermocouple and second thermocouple, respectively.

11. The system of claim 10 wherein said portable data collection module has on its side, opposite to said one side, a mercury switch rigidly connected to said portable data collection module and closable when said portable data collection module is turned upside down, and alarm means activated by said mercury switch in said upside down position for preventing overheating of said portable data collection module; said portable data collection module having generally rectangular metal housing, a window in one wall of said housing, said at least one UV detector being mounted inside said housing for exposure to UV radiation through said window, said shielding means comprising a stack of shields and filters positioned between said window and said at least one detector for limiting radiation incident upon said at least one detector, said diffuser being a part of said stack.

12. A method of monitoring UV radiation and temperature in UV curing of objects comprising the steps of:
passing said objects through a UV furnace together with a portable data collection module which experiences the effect of the same environment as said objects, said portable data collection module having identification data, means for detecting, memorizing, and transmitting data;
measuring with the use of said portable data collection module: a first temperature of said environment within a predetermined time interval; a second temperature inside said portable data collection module during said time interval; UV radiation exposure data; calibration data for the measurements; and identifying said portable data collection module by means of said identification data;
storing said data and said temperatures in said portable data collection module;
moving said data collection module to a docking station located remotely from said furnace, said docking station containing a data processing unit and display means;
electrically connecting said portable data collection module to said docking station;
transmitting said UV radiation exposure data, said first temperature, said second temperature, said calibration data, and said identification data from said means for detecting, memorizing, and transmitting data to said data processing unit; and
processing the UV radiation exposure data, temperatures, and calibration data for controlling UV curing of said objects and correcting the operation of said portable data processing module;
said portable data collection module having at least one UV detector for obtaining UV radiation exposure data, means for measuring a first temperature in said UV furnace, means for measuring a second temperature inside said portable data collection module, means for storing and transmitting said data, said first temperature, and said second temperature; an identification data of said portable data collection module; and shield means on one side of said portable data collection module for shielding said at least one UV detector and said means for measuring said first temperature from harsh environment of said UV furnace.

13. In a system for curing and monitoring UV radiation in UV curing of objects:
a UV curing furnace having means for transporting objects to be cured through the furnace;
a portable data collection module which is transported through the furnace with the objects and experiences the same environment within the furnace as the objects, said module having at least one UV detector for obtaining UV radiation exposure data, means for measuring a first temperature in the furnace, means for measuring a second temperature inside the module; and
a docking station located remotely from the UV furnace and having means for receiving and processing the UV radiation exposure data, the first temperature, and the second temperature from the module.

14. The system of claim 13 wherein the module further includes means for storing data which identifies the module, and the docking station includes means for processing that data to identify the module.

15. In a system for curing and monitoring UV radiation in UV curing of objects:
a UV curing furnace having a UV source and means for transporting objects to be cured through the furnace;
a portable data collection module which is transported through the furnace with the objects and experiences the same environment within the furnace as the objects, said module having at least one UV detector for obtaining UV radiation exposure data, and a shield on a side of the module which normally faces the UV source for protecting components within the module from the direct exposure to the source; and
a docking station located remotely from the UV furnace and having means for receiving and processing the UV radiation exposure data from the module.

16. The system of claim 15 wherein the module includes a position responsive switch and an alarm which is activated by the switch in the event that the module is placed in the furnace in an inverted position with the shield facing away from the UV source.

17. In a method of monitoring UV radiation in UV curing of objects, the steps of:
transporting the objects through a UV curing furnace;
transporting a portable data collection module through the furnace with the objects so that the module experiences the same environment within the furnace as the objects,
utilizing the module to obtain UV radiation exposure data within the furnace, to measure a first temperature in the furnace, and to measure a second temperature inside the module;
connecting the module to a docking station located remotely from the UV furnace;
transferring the UV radiation exposure data, the first temperature and the second temperature from the module to the docking station; and
processing the UV radiation exposure data, the first temperature, and the second temperature at the docking station.

18. The method of claim 17 further including the steps of storing identification data for the module in the module, and processing the identification data at the docking station to identify the module.

19. In a method of monitoring UV radiation in UV curing of objects, the steps of:
transporting the objects through a UV curing furnace which has a UV source for curing the objects;
transporting a portable data collection module through the furnace with the objects with a shield on one side of the module facing toward the UV source to protect components within the module from direct exposure to the source;

obtaining UV radiation exposure data with the module while the module is within the furnace;

connecting the module to a docking station located remotely from the UV furnace;

transferring the UV radiation exposure data from the module to the docking station; and processing the UV radiation exposure data from the module at the docking station.

20. The method of claim 19 including the steps of monitoring the orientation of the module within the furnace and actuating an alarm in the event that the module is placed in the furnace in an inverted position with the shield facing away from the UV source.

* * * * *